(12) United States Patent
Gille et al.

(10) Patent No.: US 7,856,850 B2
(45) Date of Patent: Dec. 28, 2010

(54) GLASS-CERAMIC ARTICLE WITH WELD JOINT(S) AND MANUFACTURE THEREOF

(75) Inventors: Claude Gille, Bougligny (FR); Allan M. Fredholm, Hericy (FR)

(73) Assignee: Corning Incorporated, Corning, NY (US)

( * ) Notice: Subject to any disclaimer, the term of this patent is extended or adjusted under 35 U.S.C. 154(b) by 1791 days.

(21) Appl. No.: 10/880,173

(22) Filed: Jun. 29, 2004

(65) Prior Publication Data

US 2005/0014008 A1    Jan. 20, 2005

(51) Int. Cl.
    *C03B 32/02*    (2006.01)
(52) U.S. Cl. .......................... 65/33.5; 65/33.1
(58) Field of Classification Search ............... 65/33.1, 65/33.5
    See application file for complete search history.

(56) References Cited

U.S. PATENT DOCUMENTS

| 3,279,931 | A |  | 10/1966 | Olcott | |
|---|---|---|---|---|---|
| 3,661,546 | A |  | 5/1972 | Busdiecker et al. | 65/33 |
| 4,248,297 | A |  | 2/1981 | Pei | 165/166 |
| 5,931,152 | A |  | 8/1999 | Fafet et al. | 126/214 |
| 6,182,472 | B1 | * | 2/2001 | Fredholm et al. | 65/33.8 |
| 7,059,154 | B1 | * | 6/2006 | Quentin et al. | 65/99.5 |
| 2003/0230114 | A1 | * | 12/2003 | Minamikawa | 65/33.5 |
| 2004/0223715 | A1 | * | 11/2004 | Benoit et al. | 385/123 |

FOREIGN PATENT DOCUMENTS

FR    A-2735562    6/1995

\* cited by examiner

*Primary Examiner*—Queenie Dehghan
(74) *Attorney, Agent, or Firm*—Michael W. Russell

(57) ABSTRACT

Disclosed are mono- or multi-component glass-ceramic articles (10; 20; 30; 40; 50; 60; 70; 80; 90) having at least one weld joint (100), as well as a method of manufacturing such articles (10; 20; 30; 40; 50; 60; 70; 80; 90), which includes the implementation of at least one welding. The present invention is based upon mastery of the welding of glass-ceramic precursor glasses.

10 Claims, 3 Drawing Sheets

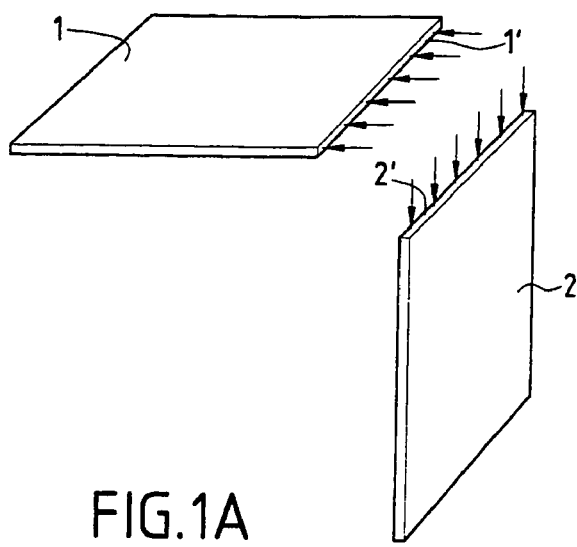
FIG.1A
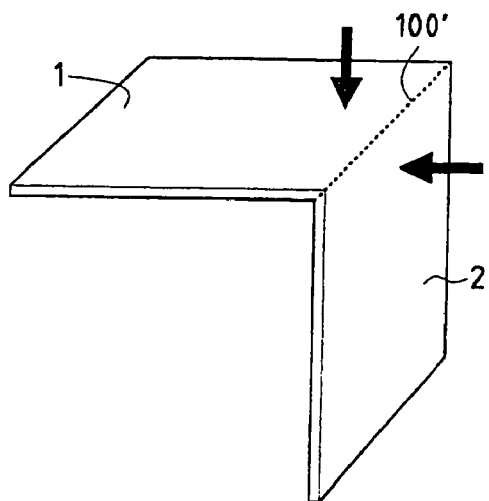
FIG.1B
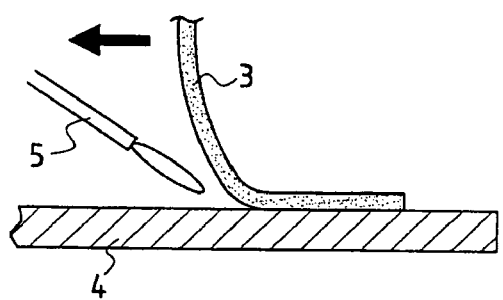
FIG.2
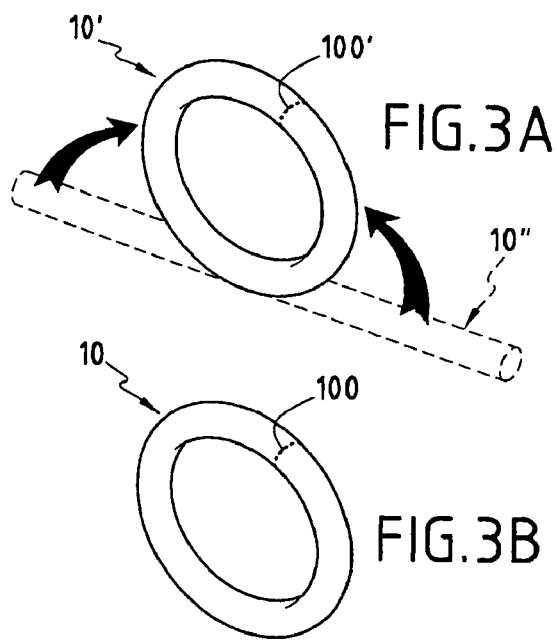
FIG.3A
FIG.3B
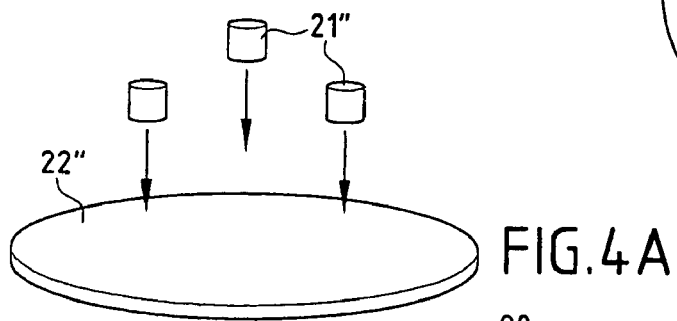
FIG.4A
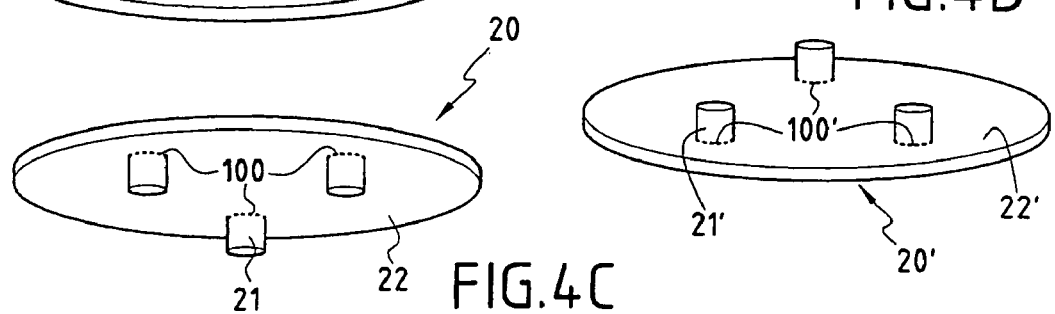
FIG.4B
FIG.4C

GLASS-CERAMIC ARTICLE WITH WELD JOINT(S) AND MANUFACTURE THEREOF

FIELD OF THE INVENTION

The present invention relates to glass-ceramic articles and method of making thereof. Particularly, the present invention relates to glass-ceramic articles having at least one weld joint as well as a method for making such articles.

BACKGROUND OF THE INVENTION

Glass-ceramic products are well known in various applications. Mention may be made, as examples, of:
  electric cooktops (which are generally perfectly flat);
  gas cooktops, either flat with cut-outs for the provision of the burners, or having three-dimensional shapes (see notably patent application FR-A-2,735,562);
  cooking utensils, such as pans, casseroles, dishes . . .
The reasons leading to the choice of the glass-ceramic material as constituent material are, essentially:
  aesthetic criteria. The glass-ceramics can in fact take numerous shapes, under numerous appearances, either opaque, or transparent and of various colours;
  good mechanical strength; and
  an excellent resistance to thermal shocks. It is in fact possible to obtain glass-ceramic materials the thermal expansion coefficient of which is very low, even zero.
The classical methods of obtaining these glass-ceramic products schematically comprise the following steps:
  the melting of a glass-ceramic precursor glass (or of a precursor filler of such a glass) in a glass-making oven;
  the shaping of said molten glass by a known glass-making method;
  the optional implementation of finishing operations (such as external or internal cut-outs, finishing of edges . . . ); and
  finally, the implementation of an adequate ceramisation heat treatment, so as to develop the microstructure sought after.
The shape of these glass-ceramic products is today thus limited by the possibilities of implementation of the shaping methods.

The methods which are mainly implemented hitherto (before the ceramisation: see above) are:
  rolling, which is implemented with non-machined laminating rollers, which enables plates of flat surfaces to be obtained, or which is implemented with at least one machined laminating roller, which enables plates with protuberance(s) and/or hollow(s) on at least one of the surfaces, to be obtained;
  rolling with suction, which enables protuberances on the plates to be generated (see notably patent application FR-A-2,735,562);
  pressing, which enables large varieties of shapes to be obtained (of cooking utensil type mentioned above), but which nevertheless remains limited in these fields of application. It is thus impossible to form, by pressing, pieces of large size and of low thickness.

In this context of making glass-ceramic products, no welding operation has, to the knowledge of the inventors, been introduced hitherto, neither before, nor after the ceramisation heat treatment.

The welding of glass pieces is a well known method, which is used notably in the manufacture of tubular elements for the chemical industry. Elements such as tubes (cylinders or hollow equivalents), rods (full, rectilinear products), are preheated to temperatures which are close to the annealing temperature of the glass considered, and a localised heating is then applied to the zones which are intended to be welded, in order to bring them to temperatures which are high enough to soften them. The pieces to be welded are then placed in contact, at their softened zones. In general, an annealing heat treatment is applied to the welded pieces so as to remove constraints caused by the welding operation.

This type of method (welding) is not applicable to glass-ceramic pieces. The application of localised heating does in fact lead inexorably to notable changes in microstructure, such as growth of the size of the crystals, the formation of crystals of different nature to that desired . . . . Changes of appearance and/or of properties (such as the expansion coefficient) results from this, which strongly deteriorate the quality of the product.

This type of method (welding) was not, a priori, applicable to elements in precursor glass(es) of glass-ceramic(s) either. In any case, a real prejudice existed as to its possible mastery.

The person skilled in the art could reasonably fear an uncontrolled ceramisation of the zones heated (i.e., the formation of zones of different colours or of milky appearance, the expansion coefficient of which differs from that of the rest of the elements in question), a fracturing of the assembly during cooling after welding, the appearance of local constraints which are incompatible with interesting mechanical properties due to the non-constancy of the expansion coefficient value within the assembly . . . .

Now, the inventors of the present invention have shown that it is possible to master such a method of manufacture of glass-ceramic products which incorporates, before the ceramisation heat treatment, at least one welding operation.

U.S. Pat. No. 3,661,546 discloses a method of making telescope mirror blanks by subjecting thermally crystallisable glass polyhedrons to a temperature sufficient to bond together adjoining surfaces of the polyhedrons, followed by nucleating and subsequently crystallizing the glass to form a unitary, thermally crystallized mirror blank.

U.S. Pat. No. 4,248,297 discloses a method of producing a matrix of low-expansion ceramic material comprising non-porous, longitudinal parallel gas passageways therethrough. Such matrix can be regenerators of a gas turbine engine. An embodiment of the method disclosed in this patent reference involves bonding glass tubes to form the matrix followed by thermal crystallization thereof.

The methods disclosed in these references both involve the heating of the whole glass components, such as the polyhedrons and the tubes, when bonding them to form the glass precursor article before ceramization. Such overall heating of the components sometimes are not feasible, or at least not economical in producing certain glass-ceramic articles. A process involving only localized heating of the bonding area is high desired.

In such a context, the present inventors have developed an original method of manufacture of glass-ceramic products having at least one welding implemented on glass-ceramic precursor glass, which involves only localized heating of the welding zone.

This original method notably enables novel shapes of glass-ceramic products to be obtained. In any case, the products obtained by said method, of novel shape or not, are novel in that they bear the signature of their original method of manufacture: the presence of at least one weld joint in their glass-ceramic structure.

SUMMARY OF THE INVENTION

According to its first object, the present invention thus relates to a glass-ceramic article, the mono-component or multi-component structure of which has at least one weld joint.

It was obtained from a single element (piece) or from at least two independent elements (pieces). It was thus obtained by welding of different parts, generally of end parts, of a single element; or by welding (assembling) several elements together.

Characteristically, the glass-ceramic structure of the article of the invention bears the mark (the "signature" or "scar") of such a welding: it has at least one weld joint. The glass-ceramic has an irregularity in shape, and/or a different surface appearance, on this weld joint. This weld joint, which is more or less visible, in general affects the appearance of the article only very slightly. This weld joint can moreover materialize the separation between different glass-ceramics, e.g., which are coloured or not, coloured in different colours, or of different compositions . . . .

Glass-ceramic articles of annular or tubular shape can notably be cited as mono-component articles of the invention.

More generally, the articles of the invention result from the assembling of independent elements, which are distinct or not. Thus, according to the most common variant, the glass-ceramic articles of the invention have a structure which is at least bi-component (pluricomponent) which has at least one weld joint between the various components of said structure. Said components, which are joined together in a weld joint, even in several weld joints, are in identical or different glass-ceramics, notably by their compositions and/or their colours.

The constituent glass-ceramic(s) of the articles of the invention advantageously has (have) a $\beta$-quartz and/or $\beta$-spodumene predominant crystalline phase. The plural has been provided here insofar as it was seen that the articles of the invention can result from an assembling of components in different glass-ceramics. The $\beta$-quartz and $\beta$-spodumene crystalline phases are preferred in reference to their low thermal expansion coefficient. Articles are more particularly preferred which are of mono- or multi-component structure, the glass-ceramic of which has a $\beta$-quartz phase or a $\beta$-spodumene phase.

Glass-ceramic articles, the glass-ceramics of which have crystalline phases of another type, are in no way excluded from the context of the invention, this being notably with reference to a specific property sought after (other than the low thermal expansion coefficient, for example, stability at high temperature).

According to another aspect of the present invention, it is provided a method of manufacturing glass-ceramic articles having a mono- or multi-component structure which has at least one weld joint. Said method comprises preparing by welding a glass precursor article or mono- or multi-component structure, and ceramizing said precursor glass article into a glass-ceramic article, wherein if various glass materials are incorporated in a multi-component stcuture, the various glass materials have compatible coefficient of thermal expansion and are able to be ceramized under the same conditions, characterized in that the welding is effected by localized heating of the welding zone.

Additional features and advantages of the invention will be set forth in the detailed description which follows, and in part will be readily apparent to those skilled in the art from the description or recognized by practicing the invention as described in the written description and claims hereof, as well as the appended drawing.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings,

FIGS. 1A and 1B are perspective views of two sheets being welded at 90° angle;

FIG. 2 is a cross-sectional view of an embodiment of welding by moving localized heating;

FIGS. 3A, 4A and 4B respectively schematize the first steps of the method of manufacture of the articles of the present invention;

FIG. 3B shows in perspective a mono-component article of the invention;

FIGS. 4C, 5, 6, 7, 8, 9, 10A, 10B and 11 show multi-component articles of the invention.

DETAILED DESCRIPTION OF THE INVENTION

Figure 5:
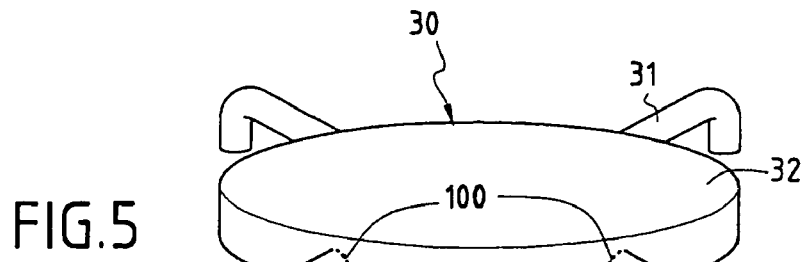

The multi-component structure of the glass-ceramic articles of the invention generally contains components of plate, rod, tube (elongated pieces, full or not) and/or pressed object type. Such components are incorporated, in such a structure, welded to components of the same type and/or to components of a different type. Thus, the at least bi-component structure of a glass-ceramic article of the invention is able to contain:

at least two plates: e.g., four, five plates welded edge to edge, at 90°, in order to delimit a volume;

at least one plate and at least one object from the rod/tube family set forth above (families of elongated pieces, full or hollow): e.g., a short object of said family arranged perpendicularly to the surface of a plate or a long object from said family "laid down" on the surface of such a plate;

at least two objects from the rod/tube family, or at least one pressed object and at least one object from the rod/tube family.

The list above is in no way exhaustive.

The person skilled in the art will already have understood the interest of the present invention and notably the numerous openings which are offered to the "welded" articles described above.

They can be notably used as, or consist of:

oven muffle elements: assemblies of 4 or 5 plates;

support grids: such as grids which are intended for supporting pans on a gas cooktop or heat treatment or thermo-chemical treatment support grids, which are constituted for example of at least one "long" rod;

cooktop burner caps, e.g., constituted of the assembling of a plate part and of short rods which are intended to enable the anchoring of the assembly; or plates with protuberance(s): plates which are decorated with at least one protrusion (such as a continuous line), of at least one discrete protuberance.

As specified above, the method of the invention described below enables glass-ceramic articles to be obtained which are novel due to their glass-ceramic structure having at least one weld joint, which are novel or not due to their shape. Said method of the invention does in fact enable both articles of shapes already obtained by known methods (of shaping) of the prior art, and articles of complex shape, which are unthinkable to obtain by known methods (of shaping) of the prior art, to be obtained. Said articles, which are novel due to their shape, are in general glass-ceramic articles which occupy much space compared to the volume of material constituting them and/or which develop a large surface area with respect to said volume of material constituting them. They can be characterised by two parameters, which are the ratios:

$$R_1 = \frac{\text{obstruction}}{\text{volume}}$$
$$= \frac{\text{volume of the smallest straight prism containing the product entirely}}{\text{volume of material constituting said product}}$$
$$R_2 = \frac{\text{surface area}}{\text{volume}} = \frac{\text{whole of the external surface of the product}}{\text{volume of material constituting said product}}.$$

Most of the glass-ceramic articles of the invention, which are novel due to their shape, are characterised by the values set forth below of one and/or of the other of the ratios defined above:

$R_1 \geq 8$ and/or $R_2 \geq 6$ cm$^{-1}$.

Such articles having such shape parameters have never been obtained, to the knowledge of the inventors, by prior art techniques.

A detailed description is now proposed of the second object of the present invention, i.e., the method of manufacture of glass-ceramic articles, as described above, the mono- or multi-component structure of which has at least one weld joint. It has been mentioned above that characteristically, said method includes a welding operation, before the ceramisation, i.e., a welding operation carried out on the glass-ceramic precursor glass(es).

Said method comprises:
preparing by welding a precursor article in glass-ceramic precursor glass(es), of mono- or multi-component structure, the various glasses being able to be incorporated in a multi-component structure having compatible thermal expansion coefficients and being able to be ceramised under the same conditions, and
ceramising said precursor article.

The final shape of the article of the invention is given to it before the ceramisation with the implementation of at least one welding operation. The weld(s) is (are) generated on glass-ceramic precursor glass(es).

The welding operation (even the welding operations) is (are) carried out:
on a single component, which is in general in a single glass-ceramic precursor glass: a ring or a tube can thus be made in said glass;
on at least two components (in parallel or successively if more than two components are concerned) in the same glass-ceramic precursor glass or in different glasses which are precursors of glass-ceramics. Said different glasses must obviously:

a) be compatible, mainly with respect to their thermal expansion coefficients, in order to be able to be welded together; and
b) be able to be ceramised under identical conditions. Once the assembly is made by welding, the ceramisation heat treatment is in fact applied to said assembly.

Thus, the welded glasses can be coloured or not, of different colours, even of different compositions.

The ceramisation treatment applied to the welded precursor article (having at least one weld joint) is a classical ceramisation treatment which is suitable for the ceramisation of said glass(es) in question.

The innovative step of the method claimed is without any doubt the first welding step.

In the structure of the welded assembly (the structure of the precursor glass article), each component being incorporated can remain very close to its original shape. Thus, two sheets of glass, which are welded along a common edge, have their respective structure which is hardly modified.

It is also possible that at least one of the components being incorporated undergo an appreciable deformation. Thus, an initially straight, small tube can be wound into a spiral around another tube, a rod can be curved . . . .

The first step of the method of the invention—which is the preparation of the precursor article—can therefore be implemented, on purpose, with an appreciable deformation of the single component of the precursor article or of at least one of the components of said precursor article.

Within the context of said first step: the parts of the component(s) to be welded have, by heat treatment, their viscosity lowered to an adequate value, which is less than or equal to that of their softening point, in order to implement the welding; said heat treatment being sufficiently rapid in order to prevent any initialisation of ceramisation.

The welding implemented is a classical welding: glass/glass welding, but it suffices to master it perfectly in order to prevent any initialisation of ceramisation. It does in fact suffice to operate rapidly.

The operation technique is to be optimised as a function of the glass(es) in question and of the shape of the zones to be welded . . . .

The parts to be welded are treated with heat. It is in no way excluded that the whole of at least one of the components to be welded be thus treated by heat. It is in general a question of size, of the dimensions of said components.

It is generally recommended that the welding of two parts to be welded be implemented under the conditions below:
one of the parts to be welded has its viscosity reduced to a value of less than 5,000 Pa·s (50,000 poises), advantageously to a value of less than 1,000 Pa·s (10,000 poises); whereas
the other of the parts to be welded has its viscosity reduced to a value which is less than or equal to $5 \times 10^{11}$ Pa·s ($5 \times 10^{12}$ poises).

These conditions set forth on the viscosity obviously fix the conditions of temperature as a function of the glass(es) in question.

Both parts to be welded generally have their viscosity adapted to their respective dimensions. Logically, there is a tendency to heat more the component of small size to be assembled with a component of large size.

The welding implemented can be of the overall-heating type or of the moving localised heating type. Within the context of this first type of heating, the whole welding zones is subjected to localized heating, then being welded together.

Within the context of this second type of heating, a moving localised heating is carried out and the welding is made progressively.

The recommended heating conditions are the following, notably in order to obtain the lowest viscosity values set forth above (≦5,000 Pa·s, advantageously ≦1,000 Pa·s, for at least one of the parts to be welded):

it is recommended to implement an overall heating, in a period of time of less than 30 seconds, advantageously in a period of time of less than 20 seconds;

it is recommended to implement a moving localised heating with a contacting speed of greater than 100 mm/min, advantageously of greater than 200 mm/minute.

The devices which are used can be of any known type which are adapted to implement welding operations. Burners, lasers or plasmas can notably be used (and particularly oxygen-gas burners, it being possible for the gas to be selected from methane, propane, hydrogen). The use of burners and of lasers, more particularly the use of burners, is recommended.

The key step of the welding is advantageously preceded by a pre-heating of at least one of the parts to be welded, so that its viscosity be already lowered. Such a pre-heating can avoid breakage of the welded assembly during a subsequent cooling of said assembly.

It is particularly recommended to prepare the parts to be welded (at least said parts) of components of large dimensions for the welding.

The implementation of such a pre-heating is recommended to lower the viscosity of at least one of the parts in question to less than $10^{16}$ Pa·s ($10^{17}$ poises). It has been seen that said parts, for the implementation of the welding, have advantageously for one, its viscosity lowered to less than $5\times10^{11}$ Pa·s ($5\times10^{12}$ poises), and for the other, its viscosity lowered to less than 5,000 Pa·s (50,000 poises).

The key step of the welding can advantageously be followed by an annealing heat-treatment.

Except eventually in the cases of welding of components of small dimensions, it is in fact advised against leaving the assembly to cool naturally after welding (said welding having generated constraints which are susceptible to lead to breakage of the final article).

Such an annealing heat treatment (post-welding) is however totally superfluous if the components welded are ceramised directly (if said welded components are transferred rapidly to a temperature ceramisation oven).

The implementation of an annealing heat treatment is therefore recommended on components of large size if the ceramisation is foreseen deferred. Such an annealing is advantageously implemented such that the viscosity of the weld made be brought to a value of at least $10^{16}$ Pa·s ($10^{17}$ poises).

The method of the invention, as described above, can notably be according to the two variants below:

(1) Variant 1:
optional pre-heating (generally recommended),
transfer onto the welding equipment, if necessary,
welding,
annealing heat-treatment, and
deferred ceramisation.

(2) Variant 2:
optional pre-heating (generally recommended),
transfer onto the welding equipment, if necessary,
welding, and
direct ceramisation.

As mentioned above in the present text, glass-ceramics are preferred of β-quartz and/or β-spodumene predominant crystalline phase. It is recommended, in order to obtain such glass-ceramics, to implement the method of the invention with one (of the) component(s) in glass-ceramic precursor glass(es) of β-quartz and/or β-spodumene crystalline phase. Similarly, in order to obtain the articles specifically described above in the present text, the implementation of the method of the invention is recommended with at least two components of the sheet, rod, tube and/or pressed object type.

The interest of the invention will not have escaped the person skilled in the art. The variety of shapes that it is possible to obtain is stressed, in the absolute and in relation to given precursor components as well as the open possibility to obtain glass-ceramics having different parts, notably in terms of colours.

According to FIGS. 1A and 1B (perspectives), a welding of the overall type is implemented in order to weld, at 90°, two sheets 1 and 2 in a glass-ceramic precursor glass. The respective edges 1' and 2' have, firstly (FIG. 1A), been brought to the adequate temperature(s). Secondly, (FIG. 1B), said edges 1' and 2' are placed in contact: the weld is made. The dotted lines represent the weld joint 100' between said two sheets 1 and 2.

According to FIG. 2 (cross-section), a welding of the moving localised heating type is implemented. The pieces to be welded—rod 3 onto sheet 4—are heated by burner 5 and are welded progressively. Said burner 5 progresses bit by bit with the implementation of the welding.

The glass-ceramic article, of mono-component structure of FIG. 3B—of ring type, referenced 10—is shown in perspective. It was obtained by heating, bending, welding (overall heating type)(FIG. 3A) and then ceramisation of a rod 10" in a glass-ceramic precursor glass. In 100', the mark of the weld on ring 10' in said glass-ceramic precursor glass, is schematised; and in 100, the mark of the weld on ring 10 in glass-ceramic, is schematised.

On FIG. 4A, the elements to be assembled:
a disc 22" (pressed), and
rod elements 21", are shown.

This disc 22" and these elements 21" are in a glass-ceramic precursor glass. They are welded (by overall welding) according to the invention in order to generate a burner cap precursor 20' (FIG. 4B). The rod elements 21' are assembled with disc 22' by weld joints 100'.

The precursor 20' is then ceramised. Turned upside down with respect to FIG. 4B (ready for use), the final article 20 in glass-ceramic is shown on FIG. 4C. The dotted lines represent weld joints 100 between rod elements 21 and disc 22, which are constituent elements of said final article 20.

On FIGS. 5 to 9, the articles of the invention obtained:
by welding (implementation of weldings of the overall heating type) of elements in glass-ceramic precursor glass, and then
ceramisation of the assembly obtained, are shown.

Thus, on FIG. 5, a burner cap 30 is schematically shown which is suitable for supporting pans. Said burner cap 30 is constituted of four curved rods 31 and of a disc 32 (the precursor element of said disc 32 has been cut out in a flat sheet of glass-ceramic precursor glass). Said rods 31 and disc 32 are connected together via weld joints 100.

Figure 6:
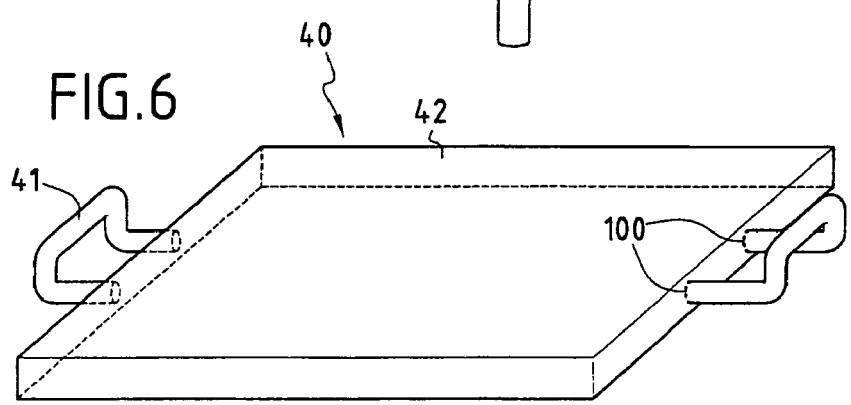

On FIG. 6, a (article of the invention which is notably useful as a) table mat 40, is shown schematically. This table mat 40 was made from a sheet and rods. Each of the rods were heated, shaped and welded in two places of the sheet in order to constitute handles. The whole was ceramised. Said table mat 40 comprises two handles 41 connected, via weld joints 100, to plate 42.

Figure 7:
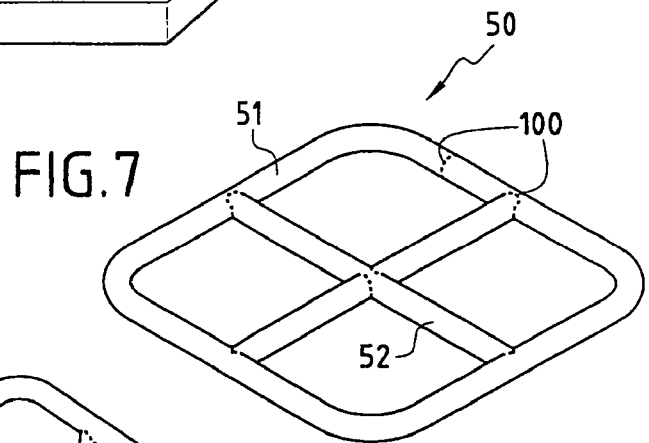

On FIG. 7, a grid 50, which is notably useful as a cooking grid, is shown schematically. This grid 50 was made from rods in a glass-ceramic precursor glass. A precursor frame of frame 51 was first of all made by heating, shaping and welding, and precursor rods of cross 52 were fixed. The whole was then ceramised. The dotted lines represent, as on the other Figures, weld joints 100.

Figure 8:
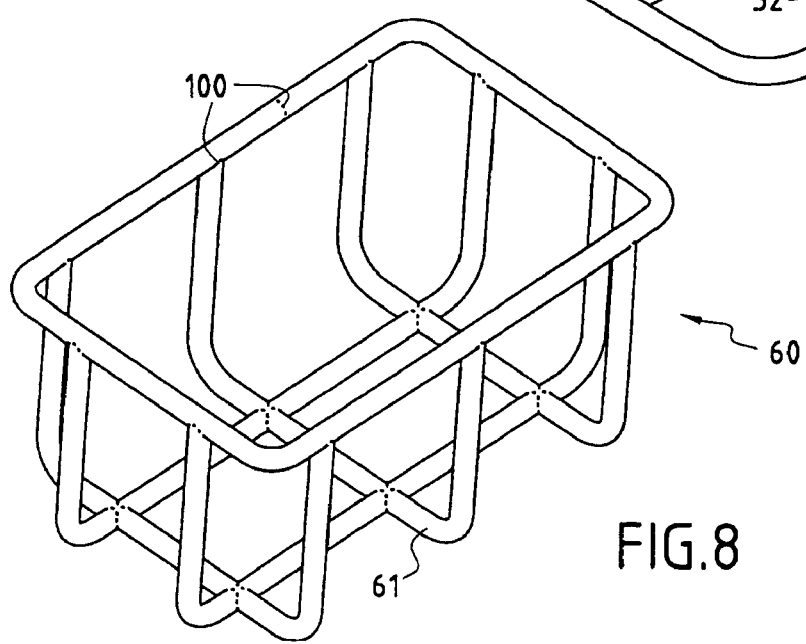

On FIG. 8, a more sophisticated structure 60 of the same type, is shown. Such a structure is obtained from glass rods, which are heated, shaped and welded. The whole is then ceramised. The dotted lines represent weld joints 100 between constituent rods 61. Such a structure can advantageously be used as a heat/thermo-chemical treatment support.

Articles 50 and 60 are articles of the invention of the same type, which are obtained by heating, shaping and assembling, and then ceramisation of rods.

Figure 9:
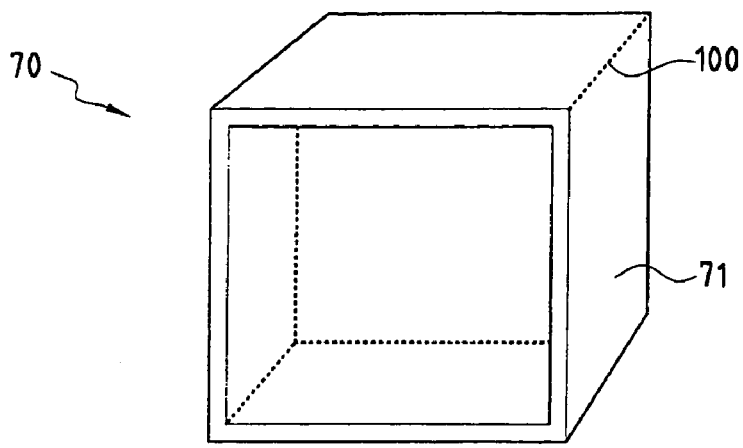

In order to obtain the article of FIG. 9, referenced 70, which can be used as an oven muffle, five sheets in a glass-ceramic precursor glass were assembled (by welding, edge to edge, at 90°), and the final assembly was ceramised. The weld joints 100 develop throughout the ridges of the polyhedron made up of five plates 71.

Figure 10A:
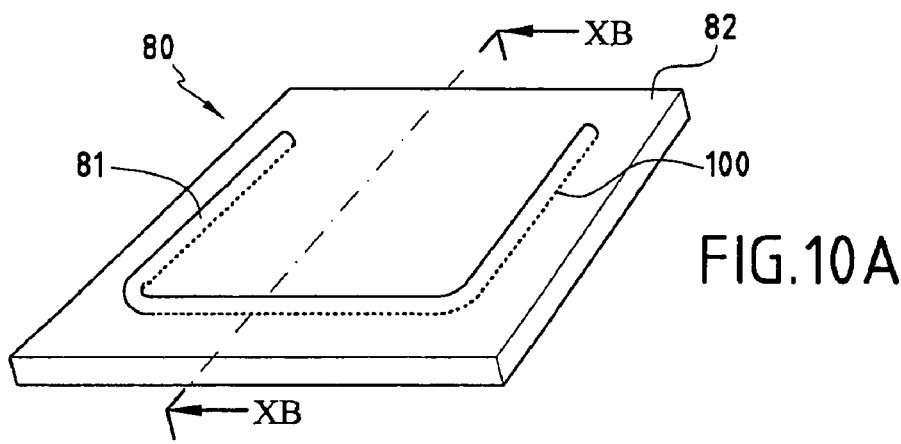
Figure 10B:
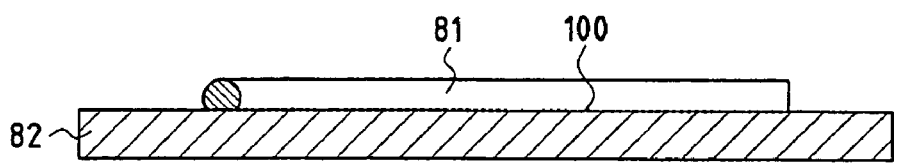

On FIGS. 10A and 10B, an article of bi-component structure 80 of the invention constituted of a plate 82 and of a rod 81, is shown in perspective and in cross-section, respectively. Said rod 81, in "U" shape (it was shaped during the welding), is laid on said plate 82. These two elements, in glass-ceramic precursor glass state, were heated and then welded by moving localised heating. The dotted lines represent the weld joint 100 (developed continuously).

On the final article, rod 81 can be present simply for aesthetic reasons or for aesthetic and practical reasons. Thus, if within the context of cooktops, said rod can serve to delimit two zones: that of the cooking and that of the command organs. If the cooking zone is delimited in a closed manner, said rod advantageously constitutes an anti-overflow barrier.

Figure 11:
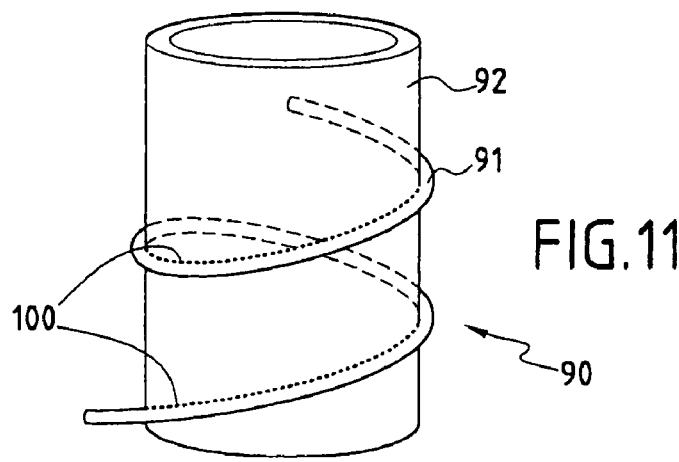

On FIG. 11, an article 90 of the invention of bi-component structure is also shown. Said bi-component structure comprises a tube 92 of large diameter, around which (with connecting together by welding) and a helically wound tube 91 of small diameter.

Such an article 90 of the invention can be used as a heat exchanger.

It is obtained from tubes in glass-ceramic precursor glass. The tube of small diameter, which is heated and shaped, is welded by moving localised heating around a tube of large diameter. The whole is then ceramised.

On the article in glass-ceramic represented, the dotted lines represent weld joint 100 (developed continuously).

The articles of the invention which are shown in the annexed Figures can be characterised by the ratios $R_1$ and $R_2$, which are defined above in the present text.

Those of FIGS. 3B, 5, 6 (in view of the shape of handles 41), 7, 8 and 9 present novel shapes which are characterised by $R_1 \geq 8$ and/or $R_2 \geq 6$ cm$^{-1}$.

That of FIG. 4C is also susceptible of being of novel shape, as a function of the shape of rods 21.

The invention is now illustrated, under the aspects of article and method, by the two Examples below.

A single glass, which is a glass-ceramic precursor, was used.

It has the following composition by weight, expressed in percentages of oxides:
$SiO_2$: 68.25
$Al_2O_3$: 19.2
$Li_2O$: 3.5
MgO: 1.2
ZnO: 1.6
BaO: 0.8
$TiO_2$: 2.6
$ZrO_2$: 1.7
$As_3O_4$: 0.6
$Na_2O+K_2O$: 0.35
$V_2O_5$: 0.2.

Such a glass is known to generate a glass-ceramic, the thermal expansion coefficient of which is very close to zero, i.e., a glass-ceramic which has an excellent resistance to thermal shocks and which is therefore particularly adapted as a constituent material of cooktops, of fire doors . . . .

The ceramisation treatment (recommended) which is implemented in the Examples below, is the following:
   rise in temperature, with a rate of 60° C./min, up to 675° C. (nucleation temperature);
   rise in temperature, through the nucleation range, from 675° C. to 790° C., in 20 minutes;
   rise in temperature up to the crystallisation temperature (930° C.), in 20 minutes;
   plateau at said crystallisation temperature (930° C.) for 12 minutes; and
   rapid cooling to ambient temperature.

Two types of precursor article in the glass having the composition by weight above were used:
   two flat sheets (thickness: 4 mm, length×width: 150×70 mm),
   a (full) cylindrical rod (of diameter: 5 mm).

EXAMPLES

Example 1

Glass-Ceramic Article: Glass-Ceramic Rod Welded onto a Glass-Ceramic Plate

A flat sheet, of 4 mm thickness (see above) was first of all pre-heated to 650° C. (which gives it a viscosity of about $4 \times 10^{13}$ Pa·s ($4 \times 10^{14}$ poises)) before being placed on an adequate support.

An oxygen methane burner was used to locally heat the 5 mm diameter rod, this being close to the zone where the flat sheet is, on which said rod must be welded, so that:
   said rod is heated locally up to about 1,350° C. (its viscosity is then about 600 Pa·s (6,000 poises)),
   said sheet receives an additional heating locally which brings its temperature, in the zone in which said rod is intended to be welded, to about 800° C. (i.e., its viscosity to about $10^9$ Pa·s ($10^{10}$ poises)).

The softened rod ($\eta \approx 6,000$ poises) is placed on, and is welded to, said flat sheet, and this with a contacting temperature (of the burner) of 1,000 mm/minute.

After welding (moving localised heating) of said rod over 300 mm, the bi-component assembly is placed in an oven at 600° C. (temperature which corresponds about to a viscosity of the glass of $10^{16}$ Pa·s ($10^{17}$ poises)). The assembly is left in said oven, under these conditions of temperature, for 30 minutes (annealing heat treatment). It is then cooled slowly.

The recommended ceramisation treatment is then applied on the bi-component assembly obtained.

According to another embodiment, the welded assembly could have been subjected to a ceramisation treatment directly (without annealing heat treatment and cooling).

The glass-ceramic article obtained is of the type of that which is illustrated in FIGS. 10A and 10B.

Example 2

Glass-Ceramic Article: Two Glass-Ceramic Plates Welded Edge to Edge (at 90°)

Two flat sheets of the type specified above (in the glass-ceramic precursor glass the composition of which by weight was indicated above, having the dimensions indicated above) were first of all pre-heated to about 650° C. (which gives them a viscosity of about $4 \times 10^{13}$ Pa·s ($4 \times 10^{14}$ poises)). They were then transferred onto adequate supports such that their two edges (length 70 mm) be very close to each other, said two sheets then being placed at 90° to each other.

These two edges are heated with the aid of a linear oxygen methane burner up to a temperature of about 1,400° C. (which lowers their viscosity to about 400 Pa·s (4,000 poises)) for 12 seconds, only. They are then placed in contact and are kept so for a period of time of 10 seconds. The two sheets are thus assembled (welded) at 90°.

The assembly thus constituted (as schematised in FIG. 1B) is placed in an oven at 600° C. (temperature which roughly corresponds to a viscosity of the glass of $10^{16}$ Pa·s ($10^{17}$ poises)). Said assembly is left so for 30 minutes, in said oven, at this temperature (annealing heat treatment).

It is then cooled slowly and then subjected to the recommended ceramisation treatment.

According to another embodiment, the welded assembly could have been subjected to the ceramisation treatment directly (without annealing heat treatment and cooling).

The two bi-component assemblies thus obtained did not reveal any weakness in the weld zone in tests of mechanical strength and of thermal shocks.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

The invention claimed is:

1. A method of manufacturing a glass-ceramic article, comprising the following steps:
   preparing by welding a precursor glass article of mono- or multi-component structure, and
   ceramizing said precursor glass article into a glass-ceramic article, wherein if various glass materials are incorporated in a multi-component structure, the various glass materials have compatible coefficient of thermal expansion and are able to be ceramized under the same conditions,
   characterized in that the welding is effected by localized heating of the welding zone.

2. The method according to claim 1, characterised in that the preparation of said precursor glass article is implemented with an appreciable deformation of its single component or of at least one of its components.

3. The method according to claim 1, characterised in that a part of component(s) to be welded have, by heat treatment, its viscosity reduced to an adequate value, which is less than or equal to that at their softening point, in order to implement the welding; said heat treatment being sufficiently rapid in order to prevent any initialisation of ceramisation.

4. The method according to claim 1, characterised in that a first part to be welded has its viscosity reduced to a value of less than 5,000 Pa·s (50,000 poises), whereas another part to be welded to the first part has its viscosity reduced to a value which is less than or equal to $5 \times 10^{11}$ Pa·s ($5 \times 10^{12}$ poises).

5. The method according to claim 1, characterised in that the welding involves an overall localized heating of the whole welding zone during welding, which is implemented in a period of time of less than 30 seconds.

6. The method according to claim 1, characterised in that the welding is a welding of moving localised heating type, which is implemented with a contacting speed of greater than 100 mm/min.

7. The method according to clam 1, characterised in that the welding is implemented with a burner or with a laser.

8. The method according to claim 1, characterised in that it comprises, before the implementation of the welding, a pre-heating of at least a part to be welded, such that the viscosity of said part to be welded be reduced.

9. The method according to claim 1, characterised in that the precursor glass article comprises precursor glass material of a glass-ceramic material comprising β-quartz and/or β-spodumene predominant crystalline phase.

10. The method according to claim 1, characterised in that the precursor article is obtained by welding at least two components of sheet, rod, tube and/or pressed object type.

* * * * *